R. WRIGHT.
Evaporating Pan.
No. 30,401. Patented Oct. 16, 1860.
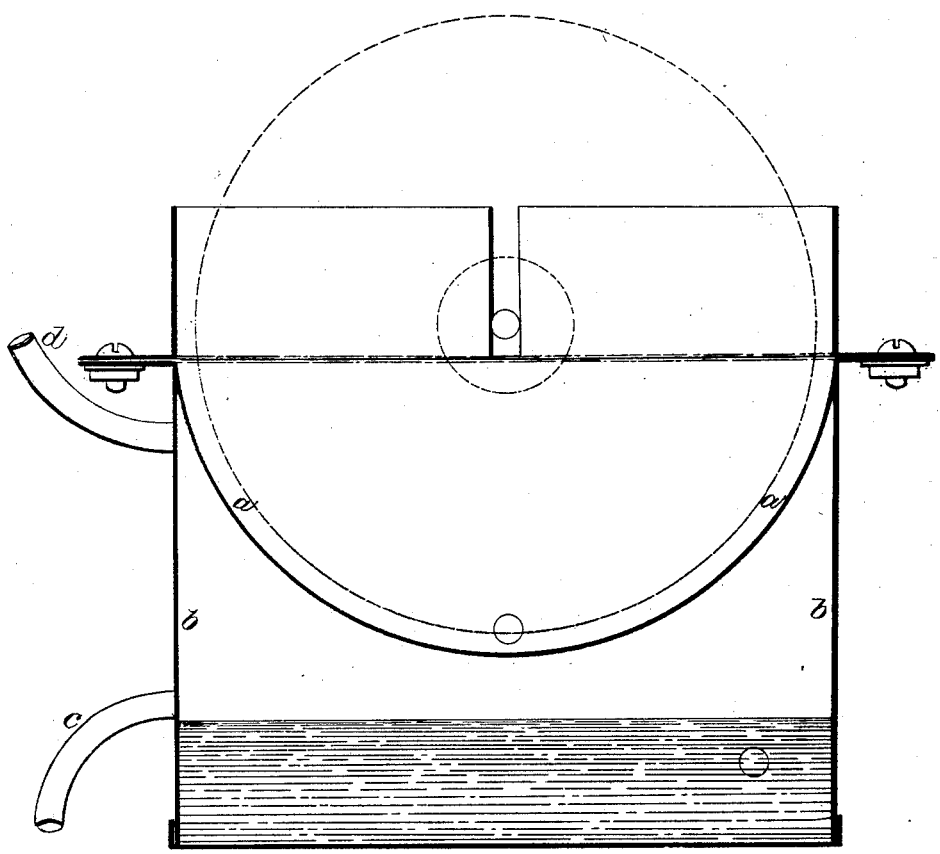
Witnesses.
Inventor.
Richard Wright

UNITED STATES PATENT OFFICE.

RICHARD WRIGHT, OF CAMBERWELL, ENGLAND.

IMPROVEMENT IN EVAPORATION OF CANE-JUICE.

Specification forming part of Letters Patent No. 30,401, dated October 16, 1860.

*To all whom it may concern:*

Be it known that I, RICHARD WRIGHT, of Grosvenor Street, Camberwell, in the county of Surrey, England, sugar-refiner, a subject of the Queen of Great Britain, have invented or discovered new and useful Improvements in the Manufacture and Refining of Sugar; and I, the said RICHARD WRIGHT, do hereby declare the nature of the said invention and in what manner the same is to be performed to be particularly described and ascertained in and by the following statement thereof—that is to say:

Heretofore, in evaporating cane-juice and saccharine solutions when manufacturing and refining sugar, it has been usual in some cases to employ fire-heat directly to the pans or vessels used, in other cases to employ steam, and in other cases to employ hot-water baths, in which the vessels containing the juice or solution have been immersed. In most, but not in all, cases the heating medium in contact with the pan or vessel containing the juice or solution of sugar has been at the least 212° Fahrenheit, and in some cases it has been the practice to employ disks to move or rotate when partly immersed in the saccharine fluid, so that the parts of such disks have when in use moved into and out of the saccharine fluid, so as to cause the fluid adhering to the surfaces to be raised out of the vessel and into contact with the atmosphere. In all such cases, when using revolving disks, the medium employed to heat the evaporating-vessel has been above 212° Fahrenheit. Now, I have discovered that the juice of the sugar-cane and saccharine solutions generally are, when using revolving disks, prejudicially acted on by being evaporated by a heating medium if it be above 212° Fahrenheit; and my invention consists in so arranging apparatus, when using rotating disks in the process of evaporating cane-juice and other saccharine solutions in the manufacture and refining of sugar, that the vapor of water may be used as the heating medium in contact with the evaporating-vessel, employed in such manner that the vapor so in contact with the vessel shall at all times be below 212° Fahrenheit.

I would state that separately I make no claim to the employment of revolving disks partly immersed in the fluid, their use being well known and understood when using a heating medium at temperatures at and above 212° Fahrenheit. Neither do I claim separately the employment of the vapor of water maintained at a temperature below 212°, such vapor having before been used for evaporating saccharine solutions. The peculiarity of my invention consists in the combined use in apparatus of revolving disks and the vapor of water below 212° Fahrenheit.

In carrying out my invention, I employ the following construction and arrangement of apparatus, though the forms thereof may be modified without departing from my invention.

In the drawing, which represents a transverse section of the apparatus used by me, $a$ is the open evaporating-vessel in which the cane-juice or other solution of sugar to be evaporated is placed. In this vessel several disks or moving surfaces are caused to dip, as shown in the drawing. These disks are by preference of copper; but they may be of any suitable material.

$b\ b$ is an external vessel of such dimensions as to admit of its containing a quantity of water below the bottom of the vessel $a$, and in such manner as to prevent the water-level rising to such a height as to come in contact with the bottom of the vessel $a$ or any part of it.

$c$ is an overflow-pipe below the level of the bottom of the vessel $a$. The vessel $b$ is open to the outer atmosphere by means of one or more open pipes, $d$. By these arrangements the water in the vessel $b$ can never be raised to a higher degree of temperature than that of boiling water, or 212° Fahrenheit, the vapor above the water, which alone is the heating medium in contact with the vessel, being thus constantly below that temperature, which I find of very great importance in practice when using in combination therewith revolving disks. The water in the vessel $b$ may be heated in any convenient manner; but I prefer that it should be heated by means of free steam generated in a separate vessel, and introduced near the bottom of the vessel $b$, and below the surface of the water therein, by which the temperature of the incoming steam will be at once reduced and the level of the water in the vessel $b$ will be maintained by the condensation of such steam, and any excess of water thereby produced will be carried off by the overflow-pipe.

I wish it to be understood that I do not claim the employment of rotating disks in open vessels separately; neither do I claim the employment of the vapor of water kept below 212° separately; but

What I claim is—

The combination of rotating disks with a vessel, $a$, and vessel $b$, so arranged that the water in the vessel $b$ cannot rise up to the vessel $a$ or the water in the vessel $b$ be raised to a higher heat than boiling water, (212° Fahrenheit,) substantially as above described.

RICHARD WRIGHT.

Witnesses:
GEO. PITT,
24 Southampton Bs.
ALXR. THOMSON,
No. 2 George Yard, Lombard Street, London.